Aug. 24, 1954  F. COURTOIS  2,687,188
ARRANGEMENT FOR LOCKING MACHINE TOOL SPINDLES
Filed Sept. 16, 1952  2 Sheets-Sheet 1

Inventor
Francis Courtois
By Robert E. Burns
Attorney

Aug. 24, 1954
F. COURTOIS
2,687,188
ARRANGEMENT FOR LOCKING MACHINE TOOL SPINDLES
Filed Sept. 16, 1952
2 Sheets-Sheet 2
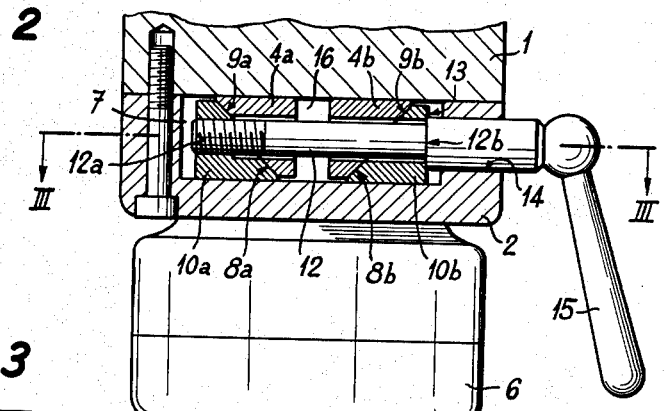
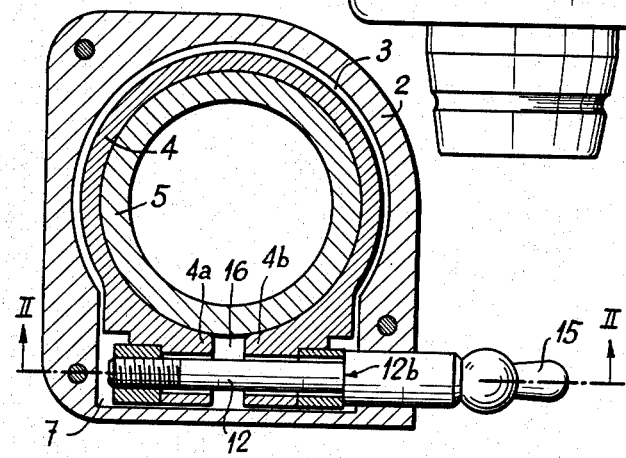
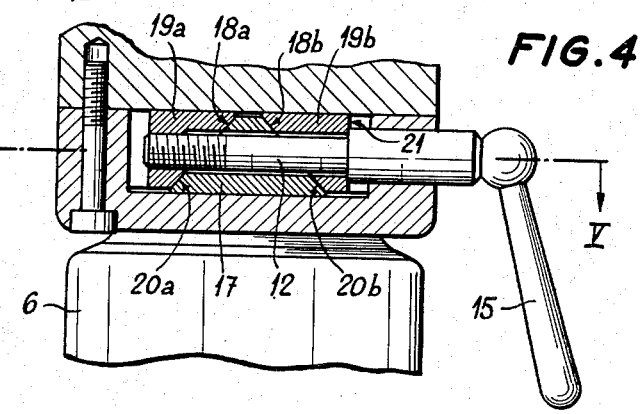
Inventor
Francis Courtois
By Robert E. Burns
Attorney Patented Aug. 24, 1954

2,687,188

UNITED STATES PATENT OFFICE 2,687,188

ARRANGEMENT FOR LOCKING MACHINE TOOL SPINDLES

Francis Courtois, Geneva, Switzerland, assignor to Societe Genevoise d'Instruments de Physique, Geneva, Switzerland, a firm of Switzerland Application September 16, 1952, Serial No. 309,843

Claims priority, application Switzerland October 10, 1951

6 Claims. (Cl. 188—77)

My invention has for its object machine tools such as boring, drilling and milling machines, the spindle of which is revolubly carried inside a quill adapted to slide inside the headstock and axially rigid with said spindle. This axial movement of the spindle with its quill serves for engaging or releasing the tool and produces the feed of the latter for all the boring and drilling operations that may require such an axial feed.

Other operations, more particularly milling operations such as surfacing and groove-cutting, are executed by shifting the work-carrying table over slideways that are perpendicular to the axis of the spindle, which latter is held in a stationary location at a predetermined distance above the table through an axial locking of the quill. This locking should be sufficiently secure for it to resist the axial thrust of the tool during operation.

It is a well known fact that milling produces through the successive engagement of the cutter teeth into the work, vibrations that are extremely detrimental to the grade of the machining, such vibrations having an intensity that increases rapidly with the stress exerted by the cutting and with the amount of overhanging of the tool on the outside of the headstock.

For surfacing and groove-cutting operations, it is therefore necessary to provide a very rigid locking of the quill and to reduce as much as possible the overhanging of the tool in order to damp these vibrations and to obtain the highest possible efficiency in the operation of the machine-tool.

Furthermore, in the case of highly accurate machining to be performed on a boring, drilling and milling machine e. g., it is essential that the position of the spindle with reference to the work to be machined, when adjusted accurately, should not be modified at the moment of the locking of the quill, as is generally the case with the usual devices which include a clamping screw carried radially by the headstock and acting on a bearing plate which abuts against the quill and clamps the latter diametrically inside the bore and shifts it thereby slightly out of centre. It is furthermore very difficult to obtain a sufficiently energetic locking of the quill with such a contrivance.

In contradistinction, when resorting to a peripheral clamping, as obtained e. g., by a collar surrounding the quill and housed without any axial play inside a cylindrical recess of the headstock, said collar being associated with a clamping screw, it is possible to obtain a clamping that is more rigid while it is more powerful and is perfectly concentric; it is, however, necessary to cut out the action of the radial play assumed of necessity by the quill so that it may freely slide inside the headstock, and to this end said collar must also be locked inside its recess while the quill is being clamped.

My invention relates to a novel arrangement for locking the quill of a boring, drilling and milling machine. It includes a split collar surrounding the quill and housed inside a circular recess of the bore of the headstock, the two ends of said collar being provided with surfaces that are oblique with reference to each other and slide inside a section of the recess forming a guideway for said ends and extending tangentially with reference to the quill, said collar being associated with a clamping screw and at least one wedge housed inside said guideway and cooperating, when controlled by said screw, with the oblique surfaces of the collar and the inner walls of the guideway to produce powerful stresses that hold the collar fast both with reference to the quill and inside the headstock.

I have illustratd by way of example in accompanying drawings a preferred embodiment of my invention, together with a modification thereof. In said drawings:

Fig. 2 is an elevational view of a detail of said machine on an enlarged scale, shown cross-sectionally through line II—II of Fig. 3.

Fig. 3 is a horizontal cross-section through line III—III of Fig. 2.

Fig. 4 is a cross-sectional view of a detail of a modification.

Figure 1:
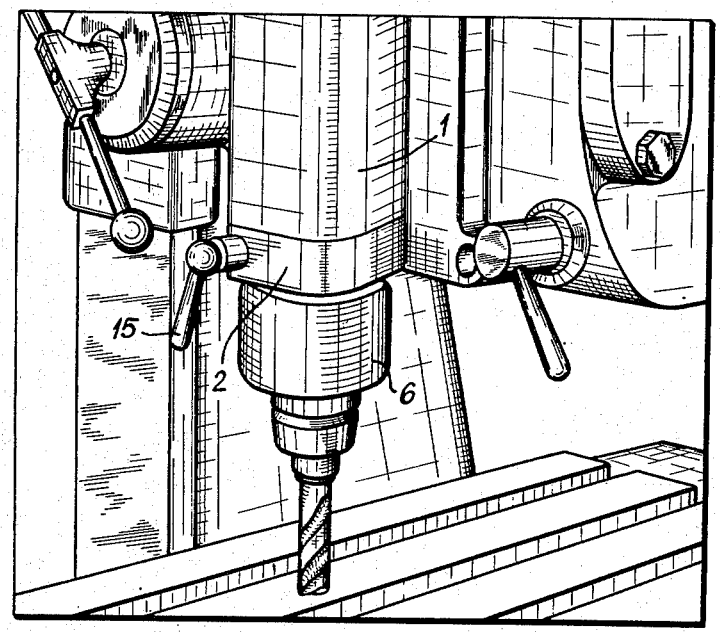
Fig. 1 is a perspective view of a portion of a boring, drilling and milling machine.

Turning to Fig. 1, the end of the headstock of the machine illustrated is designated by the reference number 1. A casing 2 rigid with the headstock 1 and forming an extension thereof is provided with an inner circular recess 3 (Fig. 3) inside which is housed a split collar 4 which latter surrounds with a slight clearance, the quill 5, inside which the spindle 6 is revolubly carried. The ends 4a and 4b of the collar 4 slide inside a portion 7 of the recess 3 forming a guideway tangent to the quill. The terminal surfaces 8a and 8b of these ends 4a and 4b (Fig. 2) are oblique and cooperate with the oblique surfaces 9a and 9b of two wedges 10a and 10b housed inside the guideway on the outside of the collar ends.

The ends 4a and 4b of the collar and the wedge 10b are provided with aligned bores allowing the free passage of a clamping screw 12. The threaded end 12a of the latter is screwed into a tapping formed in the other wedge 10a acting as a nut. The screw 12 is provided with a shoulder at 12b which bears against the outer surface 13 of the wedge 10b; the cylindrical part of the screw beyond and on the outside of the shoulder 12b is carried inside an opening 14 in the wall of the casing 2. The screw is also rigid at its outer end with a control handle 15.

It is sufficient to shift the handle 15 in one direction for the wedges 10a and 10b to exert a pressure on the ends 4a and 4b of the collar 4, whereby the latter is clamped round the quill 5 while simultaneously the sliding of the oblique surfaces 8a, 8b and 9a, 9b, with reference to one another produces an axial stress between the upper and lower surfaces of the guideway 7 which leads to sufficient friction for holding the quill fast radially.

When the handle is shifted in the opposite direction, the ends of the collar are released again and the collar, by reason of its elasticity, opens and releases the quill. This elasticity is normally sufficient for the use of a return spring in the gap 16 between the two ends of the split collar to be unnecessary.

The position of the casing 2 at the end of the headstock 1 reduces to a minimum the overhanging of the tool during the locking of the quill and cooperates thus in the damping of the vibrations produced by the milling.

Figure 5:
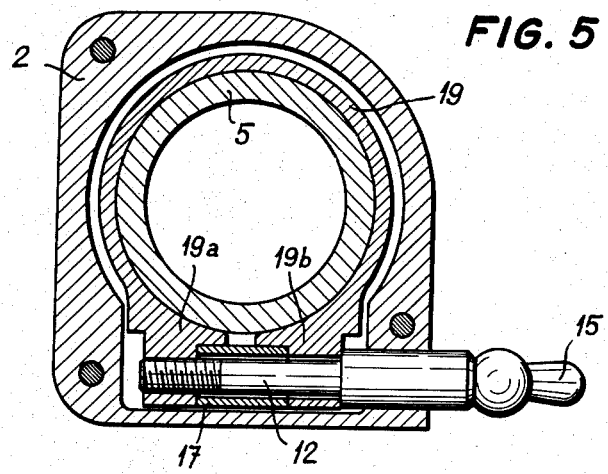
Fig. 5 is a cross-section through line V—V of the detail illustrated in Fig. 4.

In the modification illustrated in Figs. 4 and 5, I resort to a single wedge 17 provided with two oblique surfaces 18a and 18b housed between the ends 19a and 19b of the collar 19, which ends engage the oblique surfaces of said wedge through the corresponding oblique surfaces 20a and 20b respectively. The screw 12 is then screwed inside the tapping provided in the end 19a of the collar and passes through the wedge and the other collar end while it has at its other end a shoulder bearing on the outer surface 21 of the said other end 19b of the wedge. The operation is the same as that described precedingly with reference to the first embodiment.

What I claim is:

1. In a drilling, boring and milling machine, comprising a headstock formed with a circular recess, and a quill arranged in said headstock, means for locking the quill in the headstock comprising a split collar fitted over the quill and enclosed inside said circular recess, said collar ending with terminal sections having surfaces that are oblique with reference to each other, said terminal sections being adapted to assume a relative movement with reference to each other in a direction perpendicular to the axis of the quill, a clamping screw located in a plane perpendicular to the quill axis and passing through both terminal sections to urge, upon rotation, said sections towards one another for clamping said collar on the quill, at least one wedge mounted on said screw and engaging said oblique surfaces of the terminal sections, whereby upon the clamping of the collar, said wedge and said sections are shifted axially with respect to one another to grip in said recess and clamp the quill fast in the headstock over the collar.

2. In a drilling, boring and milling machine, comprising a headstock formed with a circular recess, and a quill arranged in said headstock, means for locking the quill in the headstock comprising a split collar fitted over the quill and enclosed inside said circular recess, said collar ending with terminal sections having surfaces that are oblique with reference to each other, said terminal sections being movable relative to each other in a direction perpendicular to the axis of the quill, said surfaces facing outwardly, two wedges housed inside the recess at opposite ends of said collar, and having oblique surfaces mating the obilque surfaces of said terminal sections, a clamping screw threadedly engaging one of said wedges, passing through the two terminal sections and through the other wedge and including a shouldered part engaging the outside of lastmentioned wedge and means for controlling the angular setting of said clamping screw.

3. In a drilling, boring and milling machine, comprising a headstock formed with a circular recess, and a quill arranged in said headstock, means for locking the quill in the headstock comprising a split collar fitted over the quill and enclosed inside said circular recess, said collar ending with terminal sections defining a gap in the collar and having surfaces that are oblique with reference to each other, said terminal sections being adapted to assume a relative movement with reference to each other in a direction perpendicular to the axis of the quill, said surfaces facing each other, a wedge mounted between the two terminal sections and having two sloping lateral surfaces mating the oblique surfaces on the terminal sections, a clamping screw threadedly engaging one terminal section, extending through the wedge and through the other terminal section and having a shouldered portion engaging the outside of the second terminal section, the axis of said clamping screw being perpendicular to the plane of symmetry passing through the gap in the collar and means for the hand control of said clamping screw on the outside of said headstock.

4. In a drilling, boring and milling machine, the combination of a headstock, formed with a circular recess which is provided with an enlargement forming a guideway and extending tangentially with reference to the headstock bore, a spindle, a quill axially movable in the headstock bore and revolubly carrying said spindle, a split collar fitted between the quill and the inner wall of the circular recess and provided with a gap registering with the radius of the recess perpendicular to the guideway, said collar including at either side of said gap a terminal section, lying inside the guideway, at least one terminal section having a surface oblique with reference to the quill axis, a wedge engaging the oblique surface on said terminal section and screw means controlled from the outside of the headstock and adapted to shift the wedge with reference to said oblique surface and to fit thereby the collar between the headstock and the quill.

5. In a drilling, boring and milling machine, the combination of a headstock, formed with a circular recess which is provided with an enlargement forming a guideway and extending tangentially with reference to the headstock bore, a spindle, a quill axially movable in the headstock bore and revolubly carrying said spindle, a split collar fitted between the quill and the inner wall of the circular recess and provided with a gap registering with the radius of the recess perpendicular to the guideway, said collar including at either side of said gap a terminal section, lying inside the guideway, at least one terminal section having a surface oblique with reference to the quill axis, said oblique surface facing the gap, a wedge the outer surfaces of which engage slidingly the surfaces of the terminal sections facing the gap and means operable from the outside of the headstock and threadedly engaging the system constituted by the wedge and the terminal sections to control the relative position of said wedge and terminal sections longitudinally of the guideway.

6. In a drilling, boring and milling machine, the combination of a headstock, formed with a bore and with a circular recess which is provided with an enlargement forming a guideway and extending tangentially with reference to the headstock bore, a spindle, a quill axially movable in the headstock bore and revolubly carrying said spindle, a split collar fitted between the quill and the inner wall of the circular recess and provided with a gap registering with the radius of the recess perpendicular to the guideway, said collar including at either side of said gap a terminal section, lying inside the guideway, at least one terminal section having a surface oblique with reference to the quill axis, said oblique surface being located on the outside of the terminal section with reference to the gap, a wedge engaging each oblique surface, and means operable from the outside of the headstock and threadedly engaging the wedge to control the relative position of said wedge and terminal sections longitudinally of the guideway.

References Cited in the file of this patent

UNITED STATES PATENTS

| Number | Name | Date |
| --- | --- | --- |
| 707,442 | Moon | Aug. 19, 1902 |
| 1,282,901 | Masury et al. | Oct. 29, 1918 |
| 1,296,862 | Sears | Mar. 11, 1919 |
| 1,376,169 | Sears | Apr. 26, 1921 |
| 1,867,275 | McCarter | July 12, 1932 |
| 2,154,745 | Hedgpeth | Apr. 18, 1939 |
| 2,260,635 | Musselman | Oct. 28, 1941 |
| 2,368,982 | Grize | Feb. 6, 1945 |
| 2,380,055 | Linden et al. | July 10, 1945 |